Patented Feb. 5, 1935

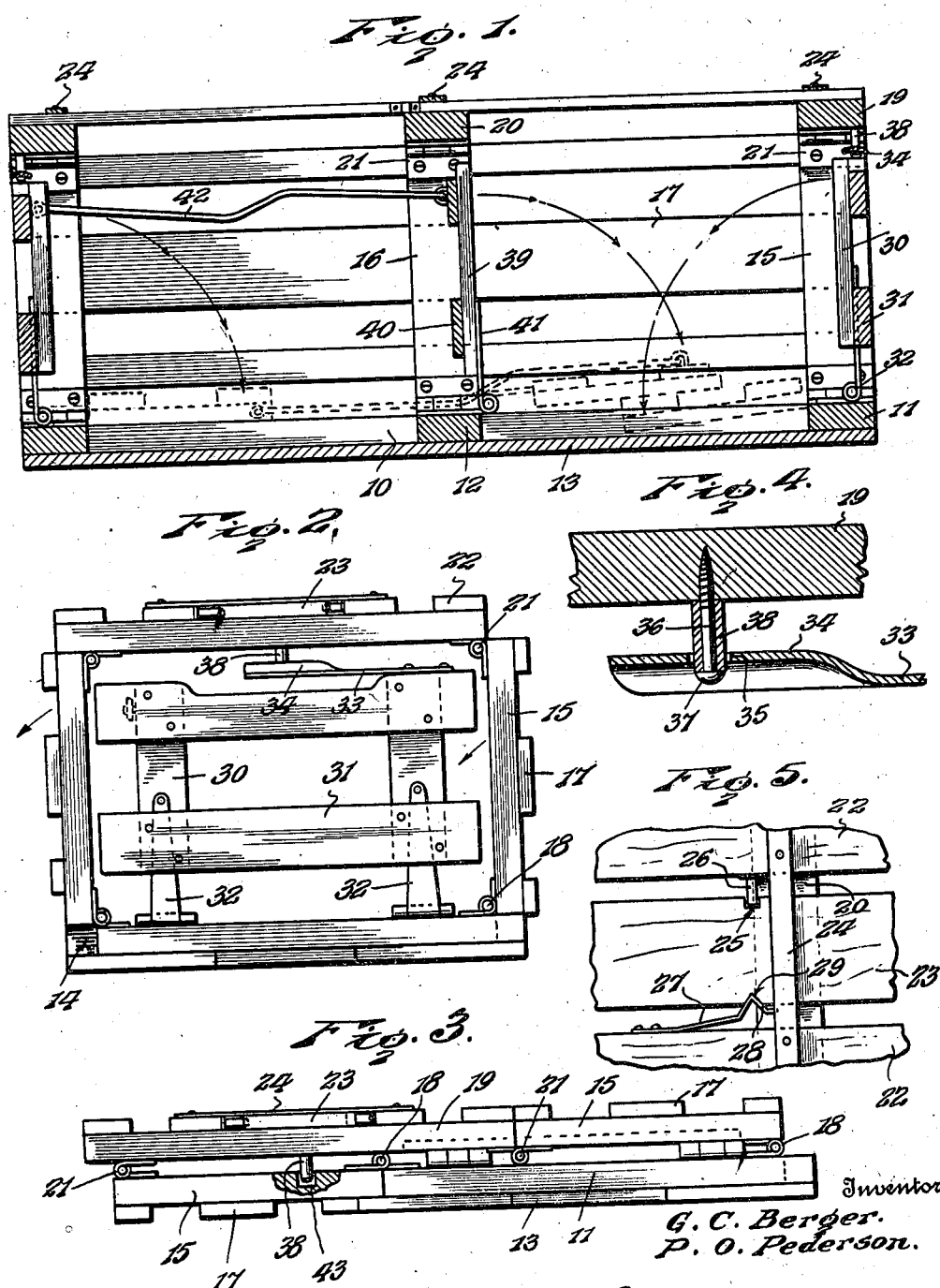

1,990,400

UNITED STATES PATENT OFFICE 1,990,400

FOLDING CRATE

George C. Berger and Peder O. Pederson,
Gonvick, Minn.

Application January 24, 1933, Serial No. 653,316

1 Claim. (Cl. 217—47)

This invention relates to an improved folding crate and while being particularly designed for poultry is, nevertheless, well adapted for use for other purposes.

The invention seeks, among other objects, to provide a poultry crate which may be collapsed to occupy a minimum of space so that after the crate has served its purpose in the shipping of poultry, it may be folded and returned in collapsed form.

A further object of the invention is to provide a crate wherein the ends of the crate may be swung inwardly to effect the folding of the crate and may, also, be swung outwardly to facilitate removal of poultry from the crate.

A further object of the invention, in this connection, is to provide a crate embodying a center partition so that the crate will comprise separate compartments and wherein the center partition will be in the form of a gate connected to one end of the crate to be swung thereby.

And the invention seeks, as a still further object, to provide convenient means whereby the poultry may be easily placed within the crate and wherein improved latches will be provided for securing the ends of the crate in closed position.

Other and incidental objects, not specifically mentioned in the foregoing, will be apparent during the course of the following description.

In the accompanying drawing,

Figure 1 is a vertical longitudinal sectional view showing our improved crate, this view showing the ends of the crate and the center partition in dotted lines folded, Fig. 2 is an end elevation of the crate, Fig. 3 is an end elevation showing the crate folded, Fig. 4 is a fragmentary sectional view showing one of the latches for the ends of the crate, and Fig. 5 is a fragmentary plan view showing the locking latch for the slidable top slat of the crate.

As will be seen upon reference to the drawing, our improved crate is oblong in general contour and comprises a bottom which includes an oblong frame formed of side bars 10, end bars 11 and a center bar 12 to which are secured closure boards 13. As seen at the right of Fig. 2, the end bars 11 overlap the ends of the adjacent side bar 10. However, as seen at the left of Fig. 2, the end bars do not overlap the ends of the other side bar but terminate short thereof to provide recesses 14.

The sides of the crate are identical and include end bars 15 and center bars 16 corresponding in width to the bars 11 and 12 of the bottom and registering therewith. Connecting the bars 15 and 16 with each other are side slats 17 and connecting said bars at their lower ends with the ends of the bars 11 and 12 are hinges 18.

The crate further includes a top which comprises end bars 19 and a center bar 20 corresponding with the bars 15 and 16 and registering therewith, and connecting the bars 19 and 20 at their ends with the upper ends of the bars 15 and 16 are hinges 21 like the hinges 18. Connecting the bars 19 and 20 with each other are side slats 22 fixed to said bars and a center slidable slat 23 which provides a door. Extending transversely between the innermost of the slats 22 are spaced straps 24 which confine the slat 23 for sliding movement, and formed in one edge of the latter slat, medially thereof, as particularly seen in Fig. 5, is a notch 25. Fixed to the inner edge of the adjacent slat 22 is a post 26 and fixed at one end to the inner edge of the other adjacent slat 22 is a spring catch 27, the free end of which bears against the adjacent edge of the slat 23 and forces this slat laterally so that the post 26 is normally seated in the notch 25. The spring catch is provided near its free end with an angularly bowed portion providing a head 28 and formed in the adjacent edge of the slat 23 is a similarly shaped notch 29 normally accommodating said head. The slat 23 is thus securely locked against endwise movement. However, by shifting said slat laterally against the tension of the spring catch 27, the post 26 becomes disengaged from the notch 25, and the slat 23 may then be moved endwise in either direction so that poultry may be readily introduced into either end of the crate.

The ends of the crate, like the sides, are identical and include end bars 30 connected by end slats 31, and connecting the end bars at their lower ends with the end bars 11 of the bottom of the crate are hinges 32. The uppermost of the end slats 31 are, as seen in Fig. 2, cut away medially and fixed to the upper edges of said slats, near opposite ends thereof, are spring latches 33. As seen in Fig. 4, the free ends of these latches curve transversely to provide concavo-convex terminals 34 in the crests of which are provided openings 35, and fixed to the end bars 19 of the top of the crate are depending pins 36 preferably provided with rounded heads 37 and equipped with sleeves 38 adapted to be freely received in said openings. Thus, when the ends of the crate are swung upwardly to vertical active position, the convex surfaces of the terminals 34 of the latches 33 will ride over the rounded heads 37 of the pins 36 until the openings 35 are brought into register with said pins whereupon the latches will snap upwardly to engage the pins through said openings for locking the ends of the crate in active position. This construction is also convenient in that, by simply depressing the free ends of the latches 34, the ends of the crate may be readily released.

We also provide a center partition which is in the form of a gate including end bars 39 connected with each other by slats 40, and connecting the end bars at their lower ends with the center bar 12 of the bottom of the crate are hinges 41. Extending between the end of the crate, seen at the left in Fig. 1, and the center partition is a rod 42 pivotally connected at its ends with said end of the crate and with said partition and, as will be observed, the end portion of this rod, adjacent the partition, is offset upwardly so that when the partition is folded downwardly to the position shown in dotted lines in Fig. 1 the offset end of the rod will extend over said partition. The rod will thus connect the partition to swing with the end of the crate seen at the left in Fig. 1 and when said end of the crate is latched in vertical active position, will support the partition in vertical active position, dividing the crate into separate compartments so that poultry of one kind may be disposed in one compartment and poultry of another kind disposed in the other compartment. Formed in the end bars of one side of the crate, as seen in Fig. 3, are recesses 43 to accommodate the pins 36 when the crate is folded.

As will now be seen, the ends of the crate may be swung outwardly, for removing poultry from the compartments of the crate, should it be desired not to shift the slat 23. Furthermore, as will be understood from the foregoing description, the ends of the crate may, when the crate is empty, be swung inwardly to the dotted line position shown in Fig. 1 when the center partition will, of course, also be folded downwardly as shown in dotted lines in this figure of the drawing. The sides of the crate may then be swung laterally to the position shown in Fig. 3 for completely collapsing the crate and, as will be observed, when the crate is thus folded, the end bars of the side of the crate seen at the left in Fig. 2 will be received at their lower ends in the recesses 14 so that one side and the top of the crate will lie in parallel relation to the bottom and the other side of the crate. We accordingly provide a particularly effective construction for the purposes set forth and a crate which, when folded, will occupy a minimum of space.

Having thus described the invention, we claim:

A folding crate including a bottom, sides and top hingedly connected with each other whereby one side and the top may be swung laterally to lie in parallel relation to the bottom and the other side of the crate, hingedly mounted ends foldable to overlie the bottom, the top including a slidable slat providing a door and said slat having a notch in one edge thereof, a post normally engaging said notch, and a spring catch engaging the opposite edge of said slat and pressing the slat laterally to maintain the slat engaged with the post.

GEORGE C. BERGER. [L. S.]
PEDER O. PEDERSON. [L. S.]